United States Patent [19]
Gupta et al.

[11] Patent Number: 5,985,131
[45] Date of Patent: Nov. 16, 1999

[54] HYDROPROCESSING IN A COUNTERCURRENT REACTION VESSEL

[75] Inventors: Ramesh Gupta, Berkeley Heights; David C. Dankworth, Whitehouse Station, both of N.J.; Dennis D. Fleming, East Horsley, United Kingdom; Edward S. Ellis, Basking Ridge, N.J.; James J. Schorfheide, Baton Rouge, La.

[73] Assignee: Exxon Research and Engineering Company, Florham Park, N.J.

[21] Appl. No.: 08/701,925

[22] Filed: Aug. 23, 1996

[51] Int. Cl.[6] ............................ C10G 45/00; C10G 41/00
[52] U.S. Cl. .............................. 208/57; 208/58; 208/210; 208/254 H; 208/59; 208/62; 208/63; 208/64; 208/66; 208/251 H
[58] Field of Search ................................ 208/57, 58, 59, 208/62, 63, 64, 66, 210, 251 H, 254 H

[56] References Cited

U.S. PATENT DOCUMENTS

| | | | |
|---|---|---|---|
| 4,624,748 | 11/1986 | Haunschild | 422/193 |
| 4,952,306 | 8/1990 | Sawyer et al. | 208/210 |
| 5,183,556 | 2/1993 | Reilly | 208/57 |
| 5,252,198 | 10/1993 | Harrison et al. | 208/210 |
| 5,522,983 | 6/1996 | Cash et al. | 210/210 |
| 5,705,052 | 1/1998 | Gupta | 208/57 |
| 5,720,872 | 2/1998 | Gupta | 208/57 |

*Primary Examiner*—Helane Myers
*Attorney, Agent, or Firm*—Henry E. Naylor

[57] ABSTRACT

A process for upgrading a liquid petroleum or chemical stream wherein said stream flows countercurrent to the flow of a treat gas, such as a hydrogen-containing gas, in at least one reaction zone. The reaction vessel used in the practice of the present invention contains vapor and optionally liquid passageway means to bypass one or more catalyst beds. This permits more stable and efficient reaction vessel operation.

19 Claims, 1 Drawing Sheet

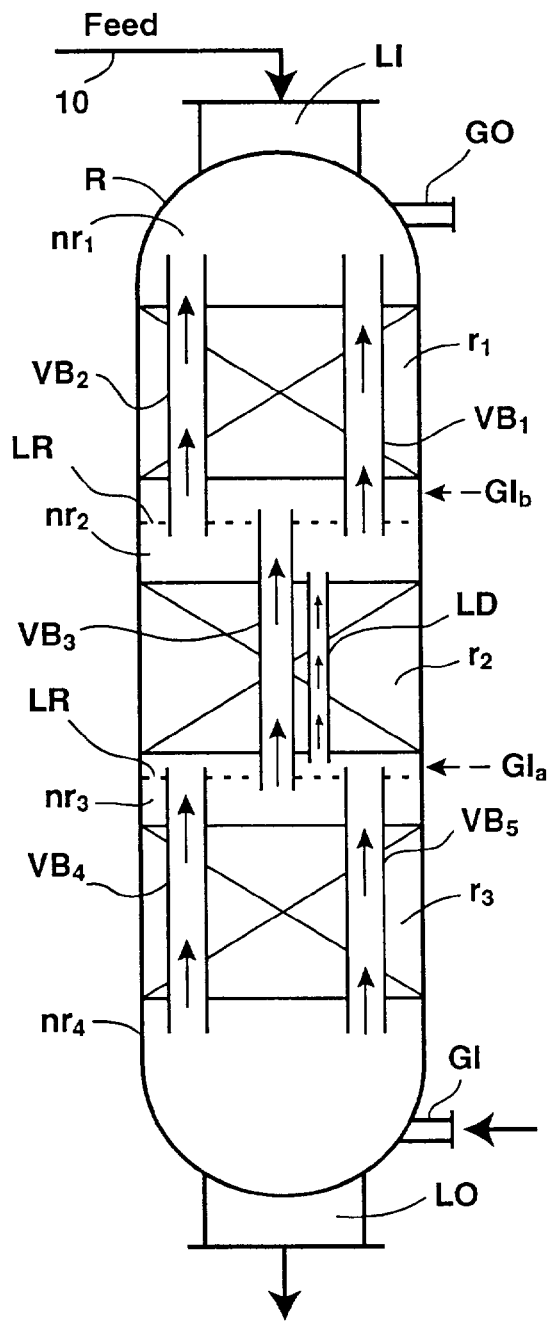
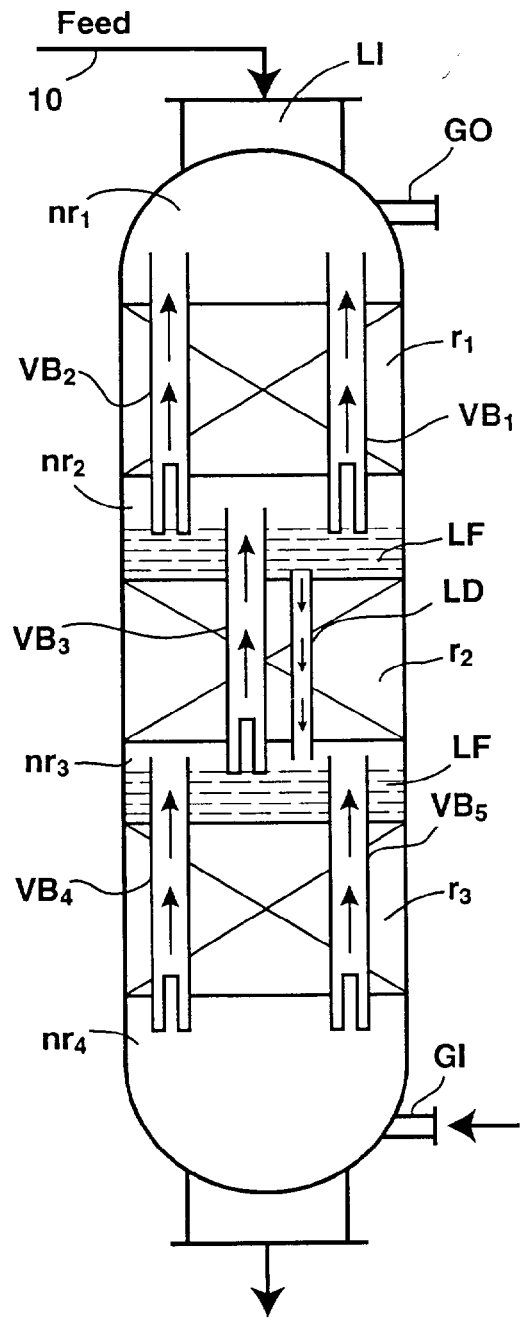
FIG. 1                    FIG. 2

HYDROPROCESSING IN A COUNTERCURRENT REACTION VESSEL

FIELD OF THE INVENTION

The present invention relates to a process for upgrading a liquid petroleum or chemical stream wherein said stream flows countercurrent to the flow of a treat gas, such as a hydrogen-containing gas, in at least one reaction zone. The reaction vessel used in the practice of the present invention contains vapor and optionally liquid passageway means to bypass one or more catalyst beds. This permits more stable and efficient reaction vessel operation.

BACKGROUND OF THE INVENTION

There is a continuing need in the petroleum refining and chemical industries for improved catalysts and process technology. One such process technology, hydroprocessing, has been subjected to increasing demands for improved heteroatom removal, aromatic saturation, and boiling point reduction. More active catalysts and improved reaction vessel designs are needed to meet this demand. Countercurrent reaction vessels have the potential of helping to meet these demands because they offer certain advantages over co-current flow reactors. Countercurrent hydroprocessing is well known, but of very limited commercial use. A countercurrent process is disclosed in U.S. Pat. No. 3,147,210 which teaches a two-stage process for the hydroprocessing-hydrogenation of high boiling aromatic hydrocarbons. The feedstock is first subjected to catalytic hydroprocessing, preferably in co-current flow with hydrogen. It is then subjected to hydrogenation over a sulfur-sensitive noble metal hydrogenation catalyst countercurrent to the flow of a hydrogen-rich gas. U.S. Pat. Nos. 3,767,562 and 3,775,291 disclose a similar process for producing jet fuels, except the jet fuel is first hydrodesulfurized prior to two-stage hydrogenation. U.S. Pat. No. 5,183,556 also discloses a two-stage concurrent-countercurrent process for hydrofining hydrogenating aromatics in a diesel fuel stream.

An apparatus is disclosed in U.S. Pat. No. 5,449,501 that is designed for catalytic distillation. The distillation apparatus, which is a vessel, contains vapor passageways which provide a means for vapor communication between fractionation sections located above and below catalyst beds. Substantially all of the vapor in the vessel rises through the vapor passageways and the desired contacting between vapor and liquid occurs in the fractionation sections.

While the concept of countercurrent hydroprocessing has been known for some time, countercurrent flow reaction vessels are typically not used in the petroleum industry, primarily because conventional countercurrent reaction vessels are susceptible to catalyst bed flooding. That is, the relatively high velocity of the upflowing treat gas prevents the downward flow of the liquid. The liquid thus cannot pass through the catalyst bed. While flooding is undesirable, catalyst contacting by the reactant liquid improves as the bed approaches a flooded condition. However, operating close to the point of incipient flooding leaves the process vulnerable to fluctuations in pressure or temperature or in liquid or gas flow rates. This could result in a disturbance large enough to initiate flooding, and process unit shutdown in order to recover stable operation. Such disruptions are highly undesirable in a continuous commercial operation.

Therefore, there still exists a need for improved countercurrent reaction vessel designs which are not as readily susceptible to flooding, and which can recover without shutdown should flooding occur.

SUMMARY OF THE INVENTION

In accordance with the present invention, there is provided a process for upgrading liquid petroleum and chemical streams in the presence of a hydrogen-containing treat gas, which process is conducted in a reaction vessel comprised of one or more vertically disposed reaction zones, wherein each reaction zone contains hydroprocessing catalyst and wherein each reaction zone is immediately preceded and immediately followed by a non-reaction zone, and wherein at least one of said reaction zones employs at least one vapor passageway means so that a portion of the upflowing vapor can bypass at least a portion of a vertical section of a reaction zone; which process comprises:

(a) passing said liquid stream to at least one reaction zone countercurrent to upflowing hydrogen-containing treat gas, in the presence of a hydroprocessing catalyst under hydroprocessing conditions, which hydroprocessing catalyst is selected from the group consisting of hydrotreating catalyst, hydrogenation catalysts, hydrocracking catalysts, hydroisomerization, and ring opening catalysts, which reaction zone contains at least one vapor passageway means extending through or around at least a portion of one or more reaction zones so that a portion of the upflowing hydrogen-containing treat gas bypasses a vertical portion of the catalyst bed of said reaction zone;

(b) recovering a vapor phase effluent from at least one countercurrent reaction zone in the immediate upstream non-reaction zone, which vapor phase effluent is comprised of hydrogen-containing treat gas, gaseous reaction products, and vaporized liquid reaction product;

(c) recovering downstream from said at least one countercurrent reaction zone a liquid phase effluent.

In a preferred embodiment of the present invention the reaction vessel contains two or more reaction zones.

In another preferred embodiment of the present invention at least one of the vapor passageway means is external to the reaction vessel.

BRIEF DESCRIPTION OF THE FIGURES

FIG. 1 hereof is a reaction vessel used in the practice of the present invention showing three reaction zones, each of which contains vapor passageways so that upflowing vapor can bypass a reaction zone, and one liquid drain means.

FIG. 2 is a representation of how the reaction vessel of FIG. 1 will respond to a flooding situation while actions are taken to return bed hydrodynamics to normalcy.

DETAILED DESCRIPTION OF THE INVENTION

Non-limiting examples of hydroprocessing processes which can be practiced by the present invention include the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of aromatics; the hydroisomerization and/or catalytic dewaxing of waxes, particularly Fischer-Tropsch waxes; and demetallation of heavy streams. It is preferred that the reaction vessels used in the practice of the present invention be those in which a hydrocarbon feedstock is hydrotreated and hydrogenated, more specifically when heteroatoms are removed and when at least a portion of the aromatic fraction of the feed is hydrogenated.

In countercurrent processing, the vertically upflowing gas hinders the downward movement of the liquid. At low liquid and gas velocities, the hindrance from the slowly moving gas is not enough to cause flooding and the liquid in the reaction vessel is able to drain through the catalyst bed or beds. However, if either the upflowing gas rate or the downflowing liquid rate is too high, liquid cannot drain through the catalyst bed. This is known as "flooding." The liquid holdup in the bed increases and liquid may begin to accumulate above the top surface of the bed. The upflowing gas rate at which flooding occurs in a given bed will depend on such things as the rate and physical properties of the downflowing liquid. Similarly, the downflowing liquid rate at which flooding occurs in a given bed similarly depends on the rate and properties of upflowing gas.

The reaction vessels used in the practice of the present invention are less susceptible to flooding than conventional countercurrent reaction vessels because of vapor passageways which act to selectively bypass a fraction of the upward-flowing treat gas through one or more of the catalyst beds. The fraction of upflowing treat gas that bypasses a catalyst bed increases as vapor pressure drop increases through the catalyst bed. Thus, the vapor passageways provide a self-adjusting regulation of upward-flowing vapor, thereby extending the hydrodynamic operating window of the reaction vessel. Further extension of this range can be provided by including one or more external vapor passageways with flow control means. Such a system provides a means by which catalyst bed pressure drop, and therefore catalyst contacting efficiency, can be controlled. Preferably, when both internal and external vapor passageways are provided, the external vapor passageways can be controlled with a control means, preferably a valve for so-called "trim" bypassing. The valve of course can be automatically controlled so that it opens and closes to the appropriate degree in response to a signal transmitted in response to pressure drop changes in the catalyst bed(s). That is, the trim bypass will be used to keep the reaction vessel operating as close to flooding as desirable. The treat gas which does not bypass a particular catalyst bed or beds will pass through the other catalyst bed(s) and serve to take part in the desired hydroprocessing reactions, carry away light or vaporized reaction products, strip catalyst poisons such as hydrogen sulfide, water and/or ammonia, etc.

Thus, the vapor passageways provide an extended operating range and an opportunity to operate close to the flooding point of the reaction vessel. This enables a more stable, more efficient reaction vessel operating regime. Further, the reaction vessel can safely and continuously operate while responding to normal process fluctuations in liquid and vapor flow rate and temperature. The range of total flow rates that can be tolerated is thereby extended. Operating close to the flooding point results in very efficient contacting because the catalyst particles are well irrigated by the downflowing liquid. In the absence of vapor passageways, a conventional countercurrent reaction vessel would need to operate at lower efficiency in order to remain operable.

The higher vapor flow rate capacity of the reaction vessels used in the practice of the instant invention provides flexibility to use higher quench gas rates and/or treat gas rates, enabling wider breadth of application for reactions involving high hydrogen consumption and heat release, such as aromatics saturation. Furthermore, the higher gas handling capacity enables the use of countercurrent reaction processing for reactions involving evolution of vapor phase products which might otherwise result in flooding due to excessive vapor generated during reaction, e.g., hydrocracking.

When flooding does occur, the reaction vessels used in the practice of the present invention are also more easily recovered and brought back to normal operation. During flooding, the liquid holdup in the bed increases and liquid may begin to accumulate above the top surface of the bed. This liquid backup must be drained to recover from flooding. The vapor passageways reduce the gas flow rate through the catalyst bed(s), allowing the liquid to more easily drain through the catalyst bed(s). The liquid drain means of the present invention also helps recover the reaction vessel from flooding.

Unless otherwise stated herein, the terms "downstream" and "upstream" are with respect to the flow of liquid which will flow downward. Further, the vessels of the present invention need not be limited to catalytic chemical reactions, but can also be used in gas-liquid contacting towers such as those used for extraction or stripping. In such cases, no reaction is necessarily involved and the upward-moving gas contacts a downward-moving liquid, typically to achieve mass transfer between the two streams.

The reaction vessels used in the practice of the present invention can be better understood by a description of an example reaction vessel, which is shown in FIGS. 1 and 2 hereof. Miscellaneous reaction vessel internals, such as flow distributor means, thermocouples, heat transfer devices etc. are not shown in the figures for simplicity. FIG. 1 shows reaction vessel R which contains liquid inlet LI for receiving a feedstock to be treated, and a liquid outlet LO for removing liquid reaction product. There is also provided treat gas inlet GI and gas outlet GO. The reaction vessel contains three serially disposed reaction zones, $r_1$, $r_2$, and $r_3$. Each reaction zone is immediately preceded and immediately followed by a non-reaction zone, $nr_1$, $nr_2$, $nr_3$, and $nr_4$. The non-reaction zone may be a void, or empty, section in the vessel. Liquid distribution means LR (which is not shown in FIG. 2 for simplicity) can be situated above each reaction zone in order to more evenly distribute downflowing liquid to the next downstream reaction zone. Each reaction zone is comprised of a bed of catalyst suitable for the desired reaction.

Five vapor passageways $VB_1$, $VB_2$, $VB_3$, $VB_4$, and $VB_5$ and one liquid drain means LD are shown for the reaction vessels of the Figures, although any number and size of the vapor passageways can be used depending on the portion of the vapor one wishes to bypass the reaction zone(s). For purposes of the present invention, it is desirable that only a portion of the vapor bypass one or more countercurrent reaction zones. It is preferred that less than about 50 vol. % be bypassed when possible. The liquid drain means serves as a vapor passageway during normal operation but can allow liquid to drain during flooding upsets. It is to be understood that more than one liquid drain means can be used in any one or more reaction zones. The size and number of such liquid drain means will be dependent on such things as the size of the reaction vessel, the packing of the catalyst in the catalyst bed(s) and the flow rate of liquid through the catalyst bed.

The reaction vessel of FIG. 1 is operated by introducing the feedstock to be treated into liquid inlet LI of reaction vessel R. A suitable treat gas, such as a hydrogen-containing gas, is introduced via port GI into the reaction vessel countercurrent to the downward flow of the liquid feedstock. It is to be understood that the treat gas need not be introduced solely at the bottom of the reaction vessel at GI, but may also be introduced into any one or more of the non-reaction zones, for example at $GI_a$ and/or $GI_b$. Treat gas can also be injected into any one or more of the catalyst beds. An advantage of introducing treat gas at various points in the reaction vessel is to control the temperature within the reaction vessel. For example, cold treat gas can be injected into the reaction vessel at various points to moderate any exothermic heat of reaction. It is also within the scope of this invention that all of the treat gas can be introduced at any one of the aforesaid points as long as at least a portion of it flows countercurrent to the flow of liquid in at least one reaction zone.

The reaction vessels used in the practice of the present invention are operated at suitable temperatures and pressures for the desired reaction. For example, typical hydroprocessing temperatures will range from about 40° C. to about 450° C. at pressures from about 50 psig to about 3,000 psig, preferably 50 to 2,500 psig. The liquid feedstock passes downward through the catalyst bed of reaction zone $r_1$, where it reacts with the treat gas on the catalyst surface. Any resulting vapor-phase reaction products are swept upwards by the upward-flowing treat gas. Such vapor-phase reaction products may include relatively low boiling hydrocarbons and heteroatom components, such as $H_2S$ and $NH_3$. Any unreacted feedstock, as well as liquid reaction product pass downwardly through each successive catalyst bed of each successive reaction zone $r_2$ and $r_3$. This Figure shows an optional liquid distribution means LR which can be positioned above each catalyst bed. The ends of the vapor passageways may be situated above or below the liquid distribution means. For example, FIG. 1 shows the upper end of vapor passageway $VB_3$ terminating at a point above liquid distribution means LR. The lower end of vapor passageways $VB_1$, and $VB_2$ terminate at a point below the liquid redistribution means LR. This arrangement allows selective bypassing of vapors produced in reaction zone $r_2$ to the reaction vessel gas outlet, while bringing a higher purity hydrogen-containing treat gas into catalyst bed $r_1$, by selectively bypassing higher-purity hydrogen-containing gas from $nr_3$ to the inlet of catalyst bed $r_1$. It is within the scope of this invention that the upper or lower ends of one or more of the vapor passageways terminate at a point within the reaction zone, such as, for example, when catalyst particles of two different sizes or geometries are employed in a single reaction zone in layers. The exact type of liquid distribution tray is not believed to limit the practice of the present invention and the reaction vessel may therefore employ any conventional distribution trays, such as sieve trays, bubble cap trays, etc. The liquid effluent exits the reaction vessel via port LO and vapor effluent via port GO. The preferred mode of operation of the reaction vessels used in the practice of the present invention is to bypass only a portion of the vapor while still maintaining enough vapor upflowing through the catalyst bed(s) to meet the treat gas (hydrogen) demand for that catalyst bed(s) with relatively high kinetic efficiency.

As previously mentioned, countercurrent reaction vessels are typically susceptible to upset by flooding. That is, the upflowing treat gas can prevent liquid feedstock and liquid effluent from flowing downward through one or more catalyst beds. FIG. 2 hereof depicts how the reaction vessel of FIG. 1 would operate during a flooding situation to get the reaction vessel back on-stream without substantial downtime. For example, during a flooding situation in reaction zone $r_2$, liquid holdup in the bed increases and liquid may begin to accumulate above the top surface of the catalyst bed. One or more liquid drain means LD are provided to allow the liquid to bypass one or more catalyst beds. Prior to flooding, the liquid drain means will act as a vapor passageway. The top of the liquid drain means can be flush with, or any height above the top surface of the catalyst bed. It is preferred that the top of the liquid drain means be substantially flush with the top surface of the catalyst bed. Any liquid that passes through the drain means can be passed to the next downstream bed or it can preferably be recycled to any one or more of the upstream reaction zones.

The vapor and liquid drain passageways may be any suitable structure constructed from a material that can withstand the operating conditions of the reaction vessel. Suitable materials include metals, such as stainless and carbon steels; ceramic materials; as well as high performance composite materials such as carbon fiber materials. Preferred are tubular passageways. The passageways need not be perfectly vertical. That is, they can be inclined or curved, or even in the form of a spiral. It is to be understood that the passageways can be of any suitable size depending on the amount and rate of vapor one wishes to bypass from one non-reaction zone to another. Further, one or more of the passageways, or drain means, can have a flat substantially horizontal member, such as a baffle, above it to prevent liquid from an upstream bed from falling into the passageways. Also, more than one passageway can be extended through at least a portion of any one or more reaction zones. It is preferred that the vapor passageways be extended entirely through the one or more reaction zones. When a plurality is used it is preferred that they be concentrically located about the vertical axis of the reaction vessel. One or more vapor passageways can also be routed external to the reaction zone. For example, a tubular arrangement can be used on the outside of the reaction vessel so that one or more non-reaction zones are in fluid communication with any one or more other non-reaction zones. The vapor passageways may contain a flow control means to control the portion of vapors which is passed from one non-reaction zone to another non-reaction zone. If the vapor passageways are external to the reaction vessel, then it is preferred that the flow control means be simply a flow control valve.

It is within the scope of the present invention that the vapor passageways bypass two or more catalyst beds, or reaction zones. Further, the vapor passageways need not be hollow structures, such as solid-walled tubes, but they may contain a packing material, such as inert balls, or catalyst particles, or both. If catalyst particles compose at least a portion of the packing material in the vapor passageways, they can be used to further react th e vapor phase reactants. The packing material and/or catalyst particles in the vapor passageways can be of a different size than the catalyst particles in the catalyst beds of the reaction zones. Such packing may help to improve the bypassing characteristics of said tubes. The vapor passageways may also perforated to allow vapor to be distributed along various levels of the catalyst bed. It is preferred that one or more co-current reaction zones be upstream of one or more countercurrent reaction zones. The zones can be in separate vessels or two or more zones can be in the same vessel. It is preferred that all countercurrent zones be in the same vessel.

The practice of the present invention is applicable to all liquid-vapor countercurrent refinery and chemical systems. Feedstocks suitable for use in such systems include those in the naphtha boiling range to heavy feedstocks, such as gas oils and resids. Typically, the boiling range will be from about 40° C. to about 1000° C. Non-limiting examples of such feeds which can be used in the practice of the present invention include vacuum resid, atmospheric resid, vacuum gas oil (VGO), a tmospheric gas oil (AGO), heavy atmospheric gas oil (HAGO), steam cracked gas oil (SCGO), deasphalted oil (DAO), and light cat cycle oil (LCCO).

Feedstocks treated by the practice of the present invention will most likely contain undesirable high levels of heteroatoms, such as sulfur and nitrogen. In such cases, it will often be preferred that the first reaction zone be one in which the liquid feedstream flows co-current with a stream of hydrogen-containing treat gas through a fixed-bed of suitable hydrotreating catalyst. The term "hydrotreating" as used herein refers to processes wherein a hydrogen-containing treat gas is used in the presence of a catalyst which is primarily active for the removal of heteroatoms, such as sulfur, and nitrogen with some hydrogenation of aromatics. The term "hydroprocessing" includes hydrotreating, but also includes processes which are primarily active toward the hydrogenation, hydrocracking, and hydroisomerization. Ring-opening, particularly of naphthenic rings, for purposes of this invention can also be included in the term "hydroprocessing". Suitable hydrotreating catalysts for use in the present invention are any conventional hydrotreating catalyst and includes those which are comprised of at least one Group VIII metal, preferably Fe, Co and Ni, more preferably Co and/or Ni, and most preferably Co; and at least one Group VI metal, preferably Mo and W, more preferably Mo, on a high surface area support material, preferably alumina. Other suitable hydrotreating catalysts include zeolitic catalysts, as well as noble metal catalysts where the noble metal is selected from Pd and Pt. It is within the scope of the present invention that more than one type of hydrotreating catalyst be used in the same reaction vessel. The Group VIII metal is typically present in the an amount ranging from about 2 to 20 wt. %, preferably from about 4to 12%. The Group VI metal will typically be present in an amount ranging from about 5 to 50 wt. %, preferably from about 10 to 40 wt. %, and more preferably from about 20 to 30 wt. %. All metals weight percents are on support. By "on support" we mean that the percents are based on the weight of the support. For example, if the support were to weigh 100 g. then 20 wt. % Group VIII metal would mean that 20 g. of Group VIII metal was on the support. Typical hydrotreating temperatures range from about 100° C. to about 400° C. with pressures from about 50 psig to about 3,000 psig, preferably from about 50 psig to about 2,500 psig. If the feedstock contains relatively low levels of heteroatoms, then the co-current hydrotreating step may be eliminated and the feedstock passed directly to an aromatic saturation, hydrocracking, and/or ring-opening reaction zone.

For purposes of hydroprocessing, the term "hydrogen-containing treat gas" means a treat gas stream containing at least an effective amount of hydrogen for the intended reaction. The treat gas stream introduced to the reaction vessel will preferably contain at least about 50 vol. %, more preferably at least about 75 vol. % hydrogen. It is preferred that the hydrogen-containing treat gas be make-up hydrogen-rich gas, preferably hydrogen.

In the case where the first reaction zone is a co-current hydrotreating reaction zone, the liquid effluent from said hydrotreating reaction zone will be passed to at least one downstream reaction zone where the liquid is passed through a bed of catalyst countercurrent to the flow of upflowing hydrogen-containing treat-gas. Depending on the nature of the feedstock and the desired level of upgrading, more than one reaction zone may be needed. The most desirable reaction products resulting from hydroprocesssing, preferably when gas oils are the feedstocks, are those containing reduced levels of sulfur and nitrogen. Product streams containing paraffins, especially linear paraffins, are often preferred over naphthenes, which are often preferred over aromatics. To achieve this, at least one downstream catalyst will be selected from the group consisting hydrotreating catalysts, hydrocracking catalysts, aromatic saturation catalysts, and ring-opening catalysts. If it is economically feasible to produce a product stream with high levels of paraffins, then the downstream zones will preferably include an aromatic saturation zone and a ring-opening zone.

If one of the downstream reaction zones is a hydrocracking zone, the catalyst can be any suitable conventional hydrocracking catalyst run at typical hydrocracking conditions. Typical hydrocracking catalysts are described in U.S. Pat. No. 4,921,595 to UOP, which is incorporated herein by reference. Such catalysts are typically comprised of a Group VIII metal hydrogenating component on a zeolite cracking base. The zeolite cracking bases are sometimes referred to in the art as molecular sieves, and are generally composed of silica, alumina, and one or more exchangeable cations such as sodium, magnesium, calcium, rare earth metals, etc. They are further characterized by crystal pores of relatively uniform diameter between about 4 and 12 Angstroms. It is preferred to use zeolites having a relatively high silica/alumina mole ratio greater than about 3, preferably greater than about 6. Suitable zeolites found in nature include mordenite, clinoptiliolite, ferrierite, dachiardite, chabazite, erionite, and faujasite. Suitable synthetic zeolites include the Beta, X, Y, and L crystal types, e.g., synthetic faujasite, mordenite, ZSM-5, MCM-22 and the larger pore varieties of the ZSM and MCM series. A particularly preferred zeolite is any member of the faujasite family, see Tracy et al. Proc. of the Royal Soc., 1996, Vol. 452, p813. It is to be understood that these zeolites may include demetallated zeolites which are understood to include significant pore volume in the mesopore range, i.e., 20 to 500 Angstroms. Non-limiting examples of Group VIII metals which may be used on the hydrocracking catalysts include iron, cobalt, nickel, ruthenium, rhodium, palladium, osmium, iridium, and platinum. Preferred are platinum and palladium, with platinum being more preferred. The amount of Group VIII metal will range from about 0.05 wt. % to 30 wt. %, based on the total weight of the catalyst. If the metal is a Group VIII noble metal, it is preferred to use about 0.05 to about 2 wt. %. Hydrocracking conditions include temperatures from about 200° to 425° C., preferably from about 220° to 330° C., more preferably from about 245° to 315° C.; pressure of about 200 psig to about 3,000 psig; and liquid hourly space velocity from about 0.5 to 10 V/V/Hr, preferably from about 1 to 5 V/V/Hr.

Non-limiting examples of aromatic hydrogenation catalysts include nickel, cobalt-molybdenum, nickel-molybdenum, and nickel tungsten. Non-limiting examples of noble metal catalysts include those based on platinum and/or palladium, which is preferably supported on a suitable support material, typically a refractory oxide material such as alumina, silica, alumina-silica, kieselguhr, diatomaceous earth, magnesia, and zirconia. Zeolitic supports can also be used. Such catalysts are typically susceptible to sulfur and nitrogen poisoning. The aromatic saturation zone is preferably operated at a temperature from about 40° C. to about 400° C., more preferably from about 260° C. to about 350° C., at a pressure from about 100 psig to about 3,000 psig, preferably from about 200 psig to about 1,200 psig, and at a liquid hourly space velocity (LHSV) of from about 0.3 V/V/Hr. to about 2 V/VHr.

The liquid phase in the reaction vessels used in the present invention will typically be the higher boiling point components of the feed. The vapor phase will typically be a mixture of hydrogen-containing treat gas, heteroatom impurities, and vaporized lower-boiling components in the fresh feed, as well as light products of hydroprocessing reactions. The vapor phase in the catalyst bed of a countercurrent reaction zone will be swept upward with the upflowing hydrogen-containing treat-gas and collected, fractionated, or passed along for further processing. If the vapor phase effluent still requires further hydroprocessing, it can be passed to a vapor phase reaction zone containing additional hydroprocessing catalyst and subjected to suitable hydroprocessing conditions for further reaction. It is to be understood that all reaction zones can either be in the same vessel separated by non-reaction zones, or any can be in separate vessels. The non-reaction zones in the later case, will typically be the transfer lines leading from one vessel to another. It is also within the scope of the present invention that a feedstock which already contains adequately low levels of heteroatoms be fed directly into a countercurrent hydroprocessing reaction zone for aromatic saturation and/or cracking. If a preprocessing step is performed to reduce the level of heteroatoms, the vapor and liquid can be disengaged and the liquid effluent directed to the top of a countercurrent reaction vessel. The vapor from the preprocessing step can be processed separately or combined with the vapor phase product from the reaction vessel of the present invention. The vapor phase product(s) may undergo further vapor phase hydroprocessing if greater reduction in heteroatom and aromatic species is desired or sent directly to a recovery system.

In an embodiment of the present invention, the feedstock can be introduced into a first reaction zone co-current to the flow of hydrogen-containing treat gas. A vapor phase effluent fraction can then be separated from the liquid phase effluent fraction between reaction zones. That is, in a non-reaction zone. The vapor phase effluent can be passed to additional hydrotreating, or collected, or further fractionated. The liquid phase effluent will then be passed to the next downstream reaction zone, which will preferably be a countercurrent reaction zone. In other embodiments of the present invention, vapor phase effluent and/or treat gas can be withdrawn or injected between any reaction zones.

The countercurrent contacting of liquid from an upstream reaction zone with upflowing treat gas strips dissolved $H_2S$ and $NH_3$ impurities from the effluent stream, thereby improving both the hydrogen partial pressure and the catalyst performance. The resulting final liquid product will contain a substantially lower level of heteroatoms and substantially more hydrogen then the original feedstock. This liquid product stream may be sent to downstream hydroprocessing or conversion processes.

What is claimed is:

1. A process for upgrading liquid petroleum and chemical streams in the presence of a hydrogen-containing treat gas, which process is conducted in a reaction vessel comprised of one or more vertically disposed reaction zones, wherein each reaction zone contains hydroprocessing catalyst and wherein each reaction zone is immediately preceded and immediately followed by a non-reaction zone, and wherein at least one of said reaction zones employs at least one vapor passageway means so that a portion of the upflowing vapor can bypass at least a portion of a vertical section of a reaction zone; which process comprises:

(a) passing said liquid stream to at least one reaction zone countercurrent to upflowing hydrogen-containing treat gas, in the presence of a hydroprocessing catalyst under hydroprocessing conditions, which hydroprocessing catalyst is selected from the group consisting of hydrotreating catalyst, hydrogenation catalysts, hydrocracking catalysts, hydroisomerization, and ring opening catalysts, which reaction zone contains at least one vapor passageway means extending through or around at least a portion of one or more reaction zones so that a portion of the upflowing hydrogen-containing treat gas bypasses a vertical portion of the catalyst bed of said reaction zone;

(b) recovering a vapor phase effluent from at least one countercurrent reaction zone in the immediate upstream non-reaction zone, which vapor phase effluent is comprised of hydrogen-containing treat gas, gaseous reaction products, and vaporized liquid reaction product;

(c) recovering downstream from said at least one countercurrent reaction zone a liquid phase effluent.

2. The process of claim 1 wherein there is provided at least one co-current reaction zone and at least one countercurrent reaction zone.

3. The process of claim 2 wherein at least one co-current reaction zone contains hydrotreating catalyst for the removal of heteroatoms from the stream and is operated under hydrotreating conditions including temperatures ranging from about 100° C. to about 400° C. at pressures from about 50 psig to about 3,000 psig.

4. The process of claim 1 wherein at least one of the countercurrent reaction zones contains hydrocracking catalyst and is operated under hydrocracking conditions including temperatures from about 200° to 425° C. and liquid hourly space velocity from about 0.5 to 10 V/V/Hr.

5. The process of claim 1 wherein at least one of the countercurrent reaction zones contains hydrogenation catalyst for the hydrogenation of aromatics and is operated at hydrogenation conditions which include temperatures from about 40° C. to about 400° C., and pressures from about 100 to 3,000 psig.

6. The process of claim 3 wherein the hydrotreating catalyst is comprised of at least one metal from Group VIII and at least one metal from Group VI of the Periodic Table of the Elements, said metals on an inorganic refractory support.

7. The process of claim 6 wherein the Group VIII metal is selected from the group consisting of a noble metal, Fe, Co and Ni, and the Group VI metal is selected from Mo and W.

8. The process of claim 7 wherein the noble metal is selected from Pt and Pd.

9. The process of claim 5 wherein the aromatic hydrogenation catalyst is comprised of nickel or a noble metal selected from Pt and Pd on an inorganic refractory support.

10. The process of claim 4 wherein the hydrocracking catalyst is comprised of a Group VIII metal on a zeolitic support, which Group VIII metal is selected from the group consisting of iron, cobalt, nickel, ruthenium, rhodium, palladium, osmium, iridium, and platinum; and wherein the zeolitic material is a zeolite having crystal pores of relatively uniform diameter between about 4 and 12 Angstroms and a silica/alumina mole ratio greater than about 3.

11. The process of claim 10 wherein the amount of Group VIII metal is from about 0.05 wt. % to 30 wt. %, based on the total weight of the catalyst, and the zeolite is selected from the group consisting of mordenite, clinoptiliolite, ferrierite, dachiardite, chabazite, erionite, and faujasites.

12. The process if claim 1 wherein three reaction zones are present, the first reaction zone being the hydrotreating reaction zone, the second reaction zone being a hydrocracking zone wherein the liquid effluent from the first reaction zone flows countercurrent to upflowing hydrogen-containing gas through a bed of hydrocracking catalyst at hydrocracking conditions, and wherein the third reaction zone is an aromatic saturation zone wherein the liquid effluent from said second reaction zone flows countercurrent to upflowing hydrogen-containing gas through a bed of hydrogenation catalyst at hydrogenation conditions.

13. The process of claim 12 wherein the hydrotreating zone is a countercurrent reaction zone.

14. The process of claim 13 wherein there is provided at least one co-current hydrotreaing reaction zone upstream of said countercurrent hydrotreating reaction zone.

15. The process of claim 1 wherein the hydrotreating catalyst is comprised of at least one metal from Group VIII and at least one metal from Group VI of the Periodic Table of the Elements, said metals on an inorganic refractory support; the hydrocracking catalyst is comprised of a Group VIII metal on a zeolitic support, which Group VIII metal is selected from the group consisting of iron, cobalt, nickel, ruthenium, rhodium, palladium, osmium, iridium, and platinum; and wherein the zeolitic material is a zeolite having crystal pores of relatively uniform diameter between about 4 and 12 Angstroms and a silica/alumina mole ratio greater than about 3; and the hydrogenation catalyst is comprised of nickel or a noble metal selected from Pt and Pd on an inorganic refractory support.

16. The process of claim 15 wherein the hydrotreating conditions include temperatures ranging from about 100° C. to about 400° C. at pressures from about 50 psig to about 2,500 psig; the hydrocracking conditions include temperatures from about 200° to 425° C. and liquid hourly space velocity from about 0.5 to 10 V/V/Hr; and the hydrogenation conditions include temperatures from about 40° C. to about 400° C., and pressures from about 200 to 1,200 psig.

17. The process of claim 3 wherein at least one of the countercurrent reaction zones contains hydrocracking catalyst and is operated under hydrocracking conditions including temperatures from about 200° to 425° C. and liquid hourly space velocity from about 0.5 to 10 V/V/Hr.

18. The process of claim 3 wherein at least one of the countercurrent reaction zones contains hydrogenation catalyst for the hydrogenation of aromatics and is operated at hydrogenation conditions which include temperatures from about 40° C. to about 400° C., and pressures from about 100 to 3,000 psig.

19. The process of claim 1 wherein at least one of the vapor passageway means also serves as a liquid drain means during reactor flooding.

* * * * *